United States Patent [19]

Medendorp et al.

[11] Patent Number: 5,764,734
[45] Date of Patent: Jun. 9, 1998

[54] METHOD AND SYSTEM FOR CONTROLLING ACCESS TO A CHANNEL

[75] Inventors: Dale Fredrick Medendorp, Crystal Lake; Timothy Mark Burke, Algonquin; Paul Louis Vilmur, Palatine; Richard James Corrigan, LaGrange; Phillip Kent Freyman, Elgin, all of Ill.

[73] Assignee: Motorola, Inc., Schaumburg, Ill.

[21] Appl. No.: 362,068

[22] Filed: Dec. 21, 1994

[51] Int. Cl.⁶ .................................................. H04M 11/00
[52] U.S. Cl. .......................... 379/90.01; 455/3.3; 455/6.3
[58] Field of Search ........................... 379/90, 94, 93, 379/64, 65, 66, 56, 96, 63, 57, 58, 59, 90.01; 455/3.1, 5.1, 6.3, 3.3; 348/12, 6, 13, 14; 370/77

[56] References Cited

U.S. PATENT DOCUMENTS

| | | | |
|---|---|---|---|
| 4,920,533 | 4/1990 | Dufresne et al. | 455/5.1 |
| 5,014,295 | 5/1991 | Kunihiro | 379/63 |
| 5,124,980 | 6/1992 | Maki | 370/77 |
| 5,303,229 | 4/1994 | Withers et al. | 455/3.1 |
| 5,329,308 | 7/1994 | Binns et al. | 455/3.1 |
| 5,343,240 | 8/1994 | Yu | 455/3.1 |
| 5,355,401 | 10/1994 | Skinner, Sr. | 379/56 |
| 5,363,428 | 11/1994 | Nagashima | 379/58 |
| 5,440,335 | 8/1995 | Beveridge | 455/6.3 |
| 5,467,384 | 11/1995 | Skinner, Sr. | 379/66 |
| 5,469,495 | 11/1995 | Beveridge | 379/56 |

*Primary Examiner*—Stella Woo
*Attorney, Agent, or Firm*—Jordan C. Powell; Charles D. Gavrilovich, Jr.

[57] ABSTRACT

The present invention provides a method and apparatus for controlling power consumption and access to telephone channels (36) in a cable telephony system (10). The system (10) has two subsystems for limiting power and access, one, when a telephone (40) is waiting to receive a call and a second when a subscriber wants to place a call. The telephone (40) is usually waiting for a telephone call. The first subsystem reduces power consumption by having a transceiver (114) for the telephone (40) only monitor for incoming calls periodically and turns off the transceiver (114) when not monitoring for calls. The second subsystem, limits system power consumption and access to channels (36) by only allowing loop current and access to channels (36) when a channel (36) is available for use. These two subsystems reduce the system power consumption and regulate the access to the telephone channels (36).

15 Claims, 7 Drawing Sheets

METHOD AND SYSTEM FOR CONTROLLING ACCESS TO A CHANNEL

FIELD OF THE INVENTION

The present invention relates generally to the field of communications and more particularly to cable telephony.

BACKGROUND OF THE INVENTION

A goal of the information super-highway is to combine telephony, video and data signals over the same cable. Cable television (CATV) operators have an existing high bandwidth cable network to the house or premise which could carry these diverse services. Several cable telephony systems have been proposed. A goal of any cable telephony system is to be backwards compatible with the existing telephony system. This requires that a subscriber to a cable telephony system be able to plug their existing telephone into the cable telephony system and have it operate in the same manner. This simple requirement poses a number of challenges to the cable telephony designer. Existing telephones are powered through the telephone line, as opposed to premise powered like a television. This provides a so called lifeline feature that allows a subscriber to make an emergency telephone call even when the premise power is down.

Existing telephone service, sometimes known as plain old telephone service (POTS), requires the operator to provide loop current, or at least twenty four volts DC at twenty five milliamps, when the subscriber's telephone is in an off-hook state. If you multiply this by the potential number of subscribers in a cable telephony system this adds up to a major power management problem. This problem is especially acute because existing cable television systems do not have to provide power for any subscriber equipment and therefore are not designed to handle this sort of power distribution problem.

Another problem in providing POTS over a cable is that the tip and ring signal is converted to a radio frequency (RF) signal. This requires at a minimum a RF transceiver with processing capabilities. Most of the time the telephone is idle, waiting for an incoming call. Monitoring for an incoming call in a cable telephony system requires the RF transceiver to be monitoring the channels continuously. To provide the lifeline feature discussed above the RF transceiver must also be powered by the cable and is thus constantly draining power in the idle mode.

The present cable power system cannot provide the necessary power required for this idle mode and would fail if a large number of subscriber's telephones went off-hook all at the same time. One solution is to increase the voltage at the headend of the cable system to provide adequate power at the subscriber's premise. This approach suffers from several drawbacks. One, the voltage at individual subscriber's premises would vary widely, since many of the power drains in a cable system are in series. Thus, it would require a complete redesign of the cable system to assure the voltages at the various subscriber premises were within operating voltages of the equipment providing POTS to the subscriber.

Another solution would be to completely redesign the power distribution system of existing cable systems. This would be extremely expensive and disruptive of the present television service provided by cable operators.

A third solution is have premise powered telephones with battery backup for emergencies. This does not meet the goal of having the cable telephony system backwards compatible with the existing telephones. It also creates a disposal problem and a management problem.

For the reasons listed above, each of the solutions to the problem of providing the power required for POTS service in a cable system has drawbacks. Thus, there exists a need for a method and system to provide cable power POTS.

DESCRIPTION OF THE PREFERRED EMBODIMENTS

For the reasons stated above, it is necessary to reduce the power consumption of plain old telephone service (POTS) in a cable telephony system to provide standard line powered telephone service. In order to understand how power consumption is reduced, it is helpful to first understand how telephony can be implemented over a coaxial cable.

Figure 1:
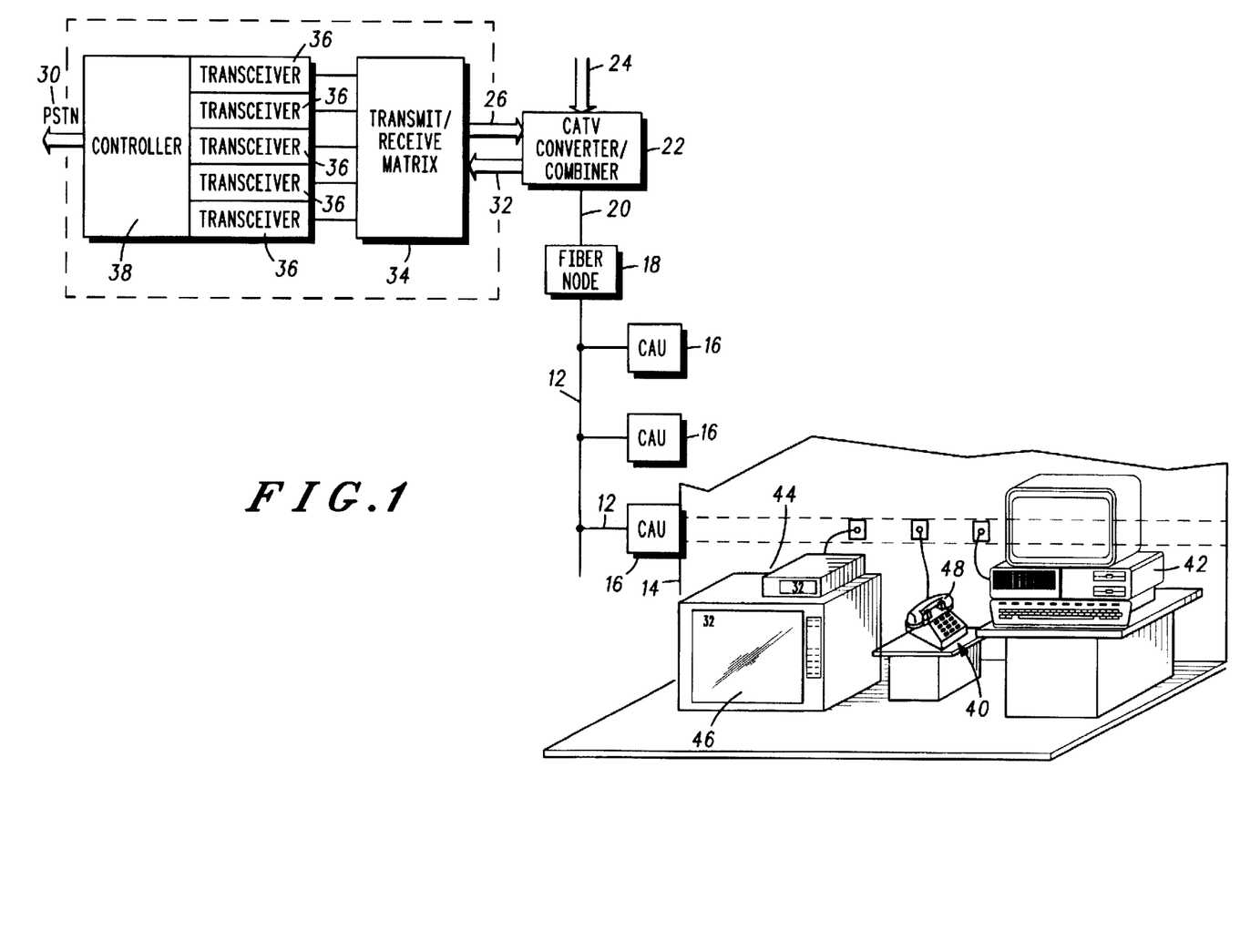
FIG. 1 is a block diagram of a cable telephony system.

FIG. 1 is a block diagram of a cable telephone system 10. A coaxial cable 12, for instances a standard cable television (CATV) cable, connects to a house or premise 14 through a cable access unit 16 on the side of the house 14. The coaxial cable 12 carries both broadcast television signals and telephone signals. All of the cable access units (CAUs) 16 connect through the cable 12 to a fiber node 18. The fiber node 18 converts the optical signals on a fiber optic cable 20 to electrical signals carried by the coaxial cable 12 and the electrical signals to optical signals. The fiber optic cable 20 connects to a CATV converter and combiner 22, that combines a CATV signal or television broadcast signals 24 and a plurality of telephone signals 26 from a cable control unit (CCU) 28. The CATV converter combiner 22 strips off the telephone signals coming from the house 14 and headed to a public switched telephone network (PSTN) 30. When the term PSTN is used in this application it is meant to broadly refer to any telephone or data network other than the cable telephony system of this application. These upstream telephone signals connect to the CCU 28 through a signal line 32. The CCU 28 has a transmit/receive matrix 34 which connects the telephone signals to an appropriate channel transceiver 36. The transceivers 36 are connected to a controller 38 that interfaces with the PSTN 30.

The CAU 16 connects a wide variety of devices to the plurality of channels carried by the cable 12. These devices include a standard telephone 40, a computer 42, and a set top box 44 for a television 46. To place a telephone call a subscriber or user would pick up a receiver 48 of the telephone 40. This places the telephone 40 in an off-hook state which is detected by the CAU 16. The CAU 16 then requests a channel from the CCU 28. The CCU 28 assigns a channel to the CAU 16 after which the telephone call proceeds essentially in the same manner as a standard telephone call. The CAU 16 has to request a channel from the CCU 28 because the telephone service is trunked, which means a channel is not dedicated to a particular CAU 16 (or house) but are held in common by the system and assigned when needed by the CAUs 16. This allows the CCU 28 to have fewer channels than there are CAUs 16. For instance, there may be one thousand CAUs 16 with telephone subscriptions and only one hundred channels 36. A trunking system works because most subscribers only use their telephones 40 a very small amount of time. Since, not all the subscribers will normally be engaged in a telephone call at once, the system can have fewer channels than subscribers and still provide instant access to the telephone system the majority of time.

When there is a call coming into a subscriber of the system 10 the CCU 28 will send out an alert to the appropriate CAU 16 on a system broadcast channel that a call is waiting. When the CAU 16 receives the alert it responds with an acknowledgment and is directed to the appropriate channel by the CCU 28. From there on a standard telephone call ensues.

Figure 2:
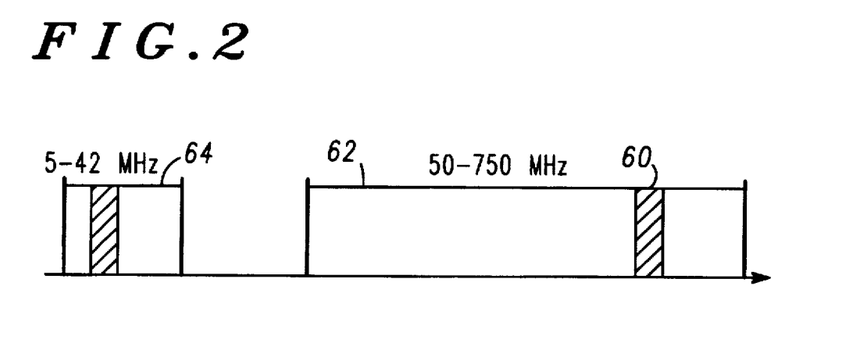
FIG. 2 is a graphical diagram of the frequency band of a cable telephony system.
Figure 3:
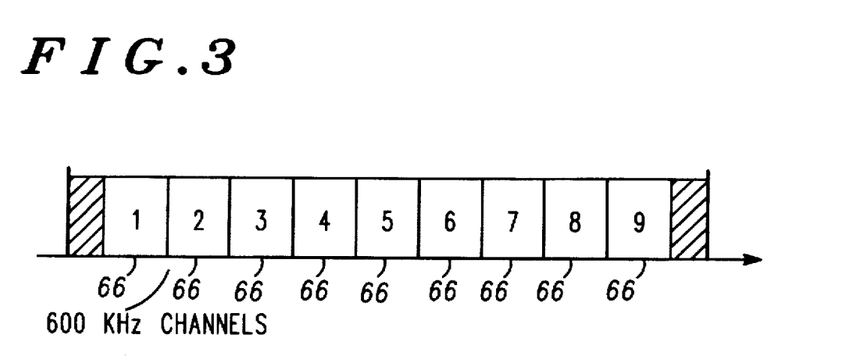
FIG. 3 is graphical diagram showing the division of a broadcast television band into a number of telephone bands.
Figure 4:
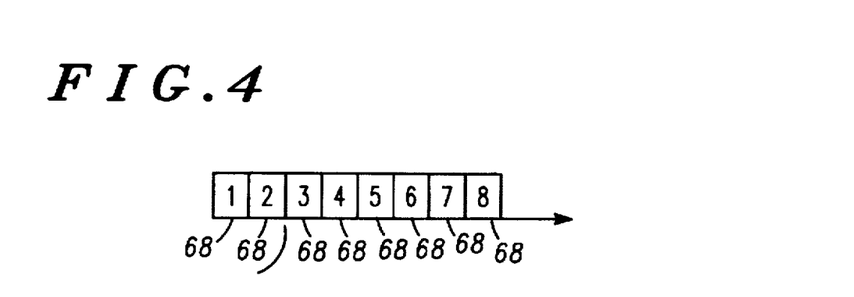
FIG. 4 is a graphical diagram of the time division multiplexing of the telephone bands.

In the preferred embodiment, the telephony system 10 is a frequency/time division multiple access system (FTDMA). The telephony system is designed to coexist with broadcast television signals on the same coaxial cable and fit within the existing CATV system; FIG. 2 shows the frequency band of a typical CATV system. The CATV system defines the acceptable frequency bands for signals as running from 5 MHz to 750 MHz. A television channel 60 occupies 6 MHz of spectrum in a downstream frequency band 62, which runs from 50 MHz to 750 MHz. An upstream frequency band 64 runs from 5 MHz to 42 MHz. In the preferred embodiment, the telephony system occupies at least one 6 MHz downstream television channel 60 and a plurality of 600 KHz upstream bands. The television channel 60 is divided up into a number of six hundred KHz telephone bands 66, see FIG. 3. Each six hundred KHz telephone band 66 is divided into a plurality of time slots 68, see FIG. 4. Each time slot 68 defines a telephone channel 34. At least one downstream telephone channel is dedicated to control information carried by a system broadcast channel, see FIG. 6 for more detail.

An important goal for a cable telephony system is to provide telephone service that is backwards compatible with the existing telephone service or Plain Old Telephone Service (POTS). This means that subscribers to a cable telephone service must be able to use their present telephones 40 with the new service. One of the important features of the present telephone service is that the telephone 40 is usable even when the subscriber's house 14 or premise loses power. This so called lifeline feature either requires battery backup with premise powering of the telephones 40 or power to be provided by the cable 12 which carries the telephone signals. Battery backup requires a large number of batteries that have to be replaced periodically. Creating a disposal problem and a management problem.

Figure 5:
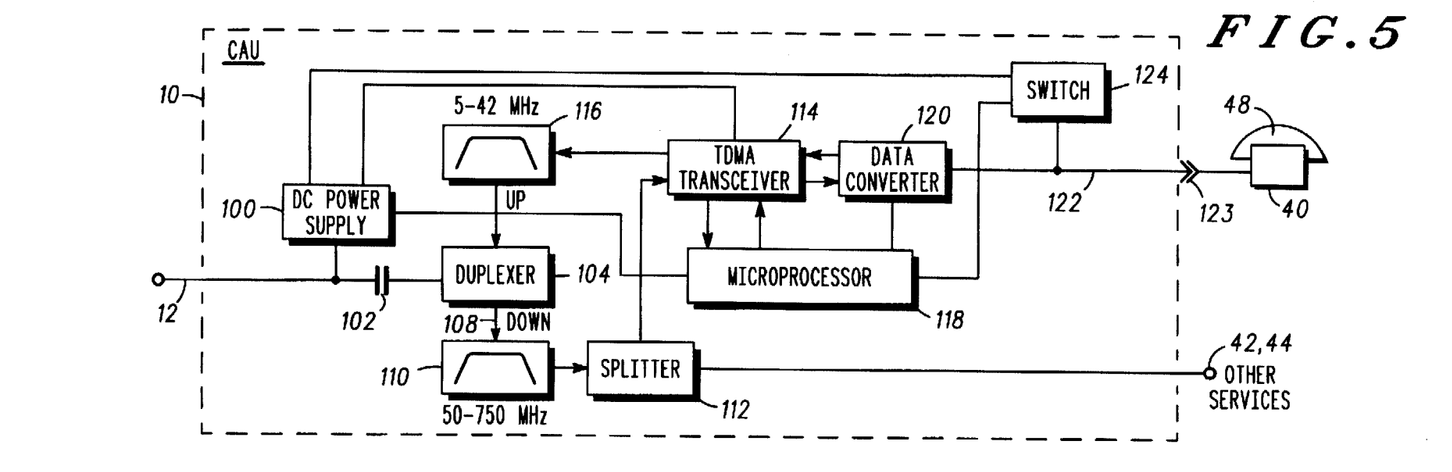
FIG. 5 is a block diagram of a cable access unit.

To understand the difficulties in providing cable 12 powered POTS in a cable telephony system 10 it is helpful to first examine how the CAU 16 operates. The CAU 16 is shown in FIG. 5. The cable 12 enters the CAU 16 and is connected to a DC power supply 100 to power the telephone 40 and the other POTS required equipment in the CAU 16. A capacitor or filter 102 blocks the low frequency, sixty hertz, power supplied by the cable 12 from the RF circuitry. A duplexer 104 connects to the capacitor 102 and splits the downstream frequency band 62 from the upstream frequency band 64. A downstream signal 108 connects to a bandpass filter 110. The bandpass filter 110 passes frequencies in the downstream frequency band 62. The downstream signal is then divided into two paths by a splitter 112. One path connects to all the non-POTS services provided over the cable 12. The other path connects to a TDMA transceiver 114 that makes up part of the POTS service.

The upstream path connects from the duplexer 104 to a filter 116 that passes the upstream frequency band 64. The filter 116 connects to the TDMA transceiver 114, which is controlled by a microprocessor 118. The TDMA transceiver 114 connects to a data converter 120. The data converter 120 takes an analog tip and ring telephone signal 122 from the POTS telephone 40 and converts the telephone signal 122 to a digital TDMA format for transmission over the cable 12. The data converter also takes the received TDMA data from the TDMA transceiver 114 and converts the signal to the analog tip and ring telephone signal 122. In the preferred embodiment, the data converter 120 is implemented in an application specific integrated chip (ASIC).

As explained above, an important feature of the cable telephony system 10 is to provide POTS. To provide POTS it is necessary to provide at least twenty four volts direct current (DC) between the tip and ring lines of the telephone 40. This is accomplished by providing sixty hertz power over the cable 12. Presently, POTS telephones 40 connect to the outside telephone lines through an RJ11 connector 123. Also the standard telephone 40 requires a radio frequency transceiver and associated circuitry in order to communicate over the cable 12. Which is shown in FIG. 5 as the TDMA transceiver 114 and microprocessor 118 and data converter 120. All these components must be powered from the cable 12, to provide POTS service. Thus, the power supply 100 supplies power to the microprocessor 118, the TDMA transceiver 114 and the data converter 120 and the tip and ring lines 122. A switch 124, controlled by the microprocessor 118, gates the power being applied to the tip and ring lines 122.

Power is consumed by the CAU 16 in two different modes. One mode is when a subscriber is attempting to place a telephone call. In this case the subscriber picks up the receiver 48 which requires the power supply 100 to provide twenty four volts DC at twenty five milliamps or loop current to the telephone 40. When the subscriber wishes to place a call the microprocessor 118 sends a message to the CCU 28 over the transceiver 114 requesting access to one of the trunked channels. Once the telephone call has been established by the microprocessor 118, the data converter 120 and the TDMA transceiver 114 all require power for the telephone call to occur.

The second mode that consumes power in the CAU 16, occurs when the telephone 40 is idle waiting for an incoming phone call. This requires the transceiver 114 and microprocessor 118 to monitor a systems broadcast channel (SBC) 200, see FIG. 6. The SBC 200 transmits control information and is divided up into alternating alert phases 202 and system information blocks 204. There are N alert phases 202 that repeat periodically. The information in each alert phase 202, see FIG. 7, includes an alert phase header 210, an alert phase ID 212, a super frame interval (SFI) or frame interval 214, a line power limiting (LPL) status flag 216, and a plurality of alert values or alert flags 218. The alert phase header 210 notifies the CAUs 16 that the information to follow is alert phase 202 information. The alert phase ID 212 defines which alert phase 202 is presently being broadcast. The SFI 214 defines how long it will be until this alert phase occurs again. The LPL status flag 216 will be discussed in detail later. The alert value 218 is a unique identifier, which alerts the associated CAU 16 that there is an incoming call.

Figures 6, 7:
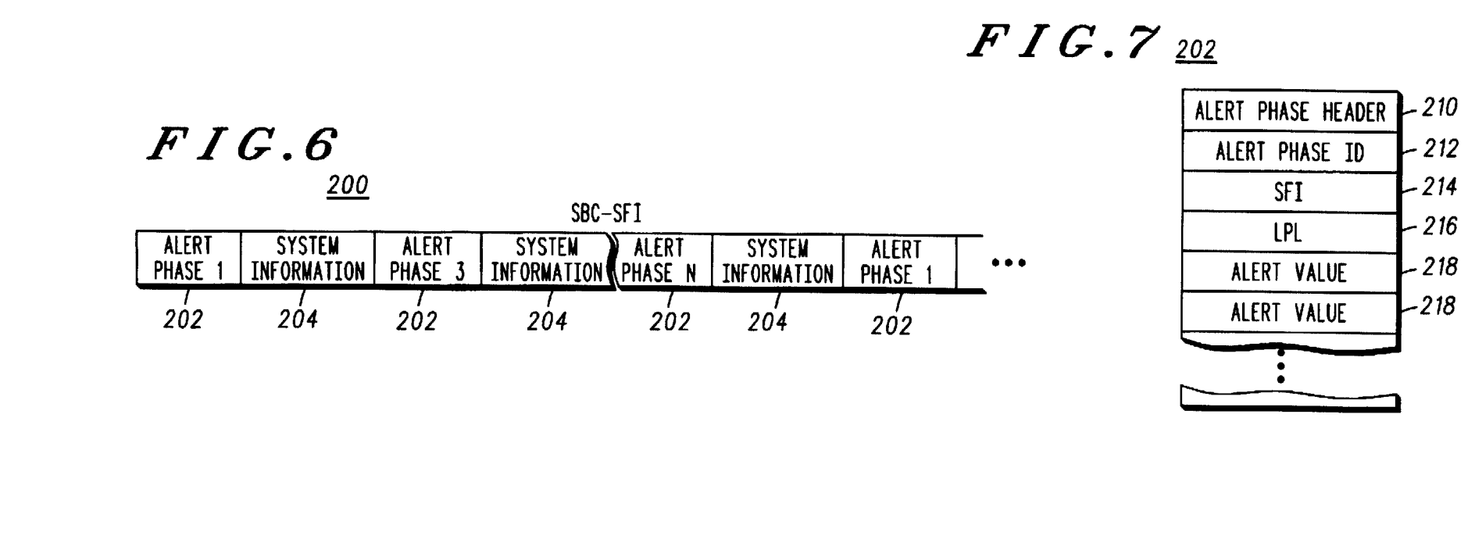
FIG. 6 is a graphical representation of a system broadcast channel.
FIG. 7 is a graphical representation of an alert phase.

Statistically, most of the time the telephone 40 is in the second mode waiting for an incoming telephone call. As a result, a major power drain on a telephone system is the power consumed in this mode. To reduce this power consumption the CAUs 16 in the cable system 10 are divided into N groups corresponding to the N alert phases 202. The CAUs 16 in the first alert phase 202 will only receive notification, via broadcast of their unique alert value 218 over the SBC 200, during the first alert phase 202. As a result, the transceiver 114 and microprocessor 118 only need to be on when waiting for a call during their CAUs 16 alert phase 202. This reduces the power consumption in this second mode by about 1/N. If there are 100 alert phases 202 this results in a significant savings in system power.

Figure 8:
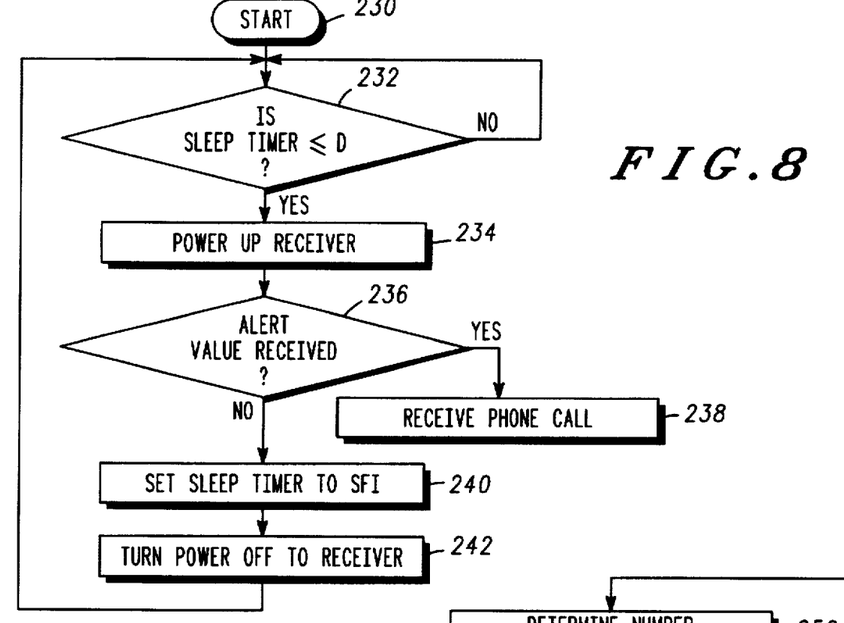
FIG. 8 is a flow chart of a process used by a cable access unit while waiting to receive an incoming telephone call.

A flow diagram of the process used in the CAU 16 is shown in FIG. 8. After the process starts 230, the CAU 16 determines, at step 232, if a sleep timer is equal to or less than zero. If the timer is not less than or equal to zero, the process waits until the timer is equal to zero. If the timer is less than or equal to zero the transceiver 114 is powered up, at step 234. Then the CAU 16 determines, in step 236, if its unique alert value 218 has been received. If its unique alert value 218 has been received, an incoming telephone call is received, at step 238. If its unique alert value 218 is not received, the sleep timer is set, at step 240, to the SFI 214. Next, the power is turned off, at step 242, to the transceiver 114. The process then begins over at step 232. This process makes up the first subsystem which controls both power consumption in the CAU 16 and channel access.

In the first mode, where a telephone call is placed by the subscriber, the biggest power drain is the twenty four volts DC at twenty five milliamps that must be supplied to the telephone 40. Because the cable telephony system 10 is trunked, the system might, for example, only be capable of handling one hundred simultaneous telephone calls even though there are one thousand telephones 40 serviced by the system 10. Since the power drain by the telephones 40 in the off-hook mode is substantial, it makes sense to size the overall system power budget so only a few telephones 40 more than one hundred can be powered in the off-hook mode at any one time. This is accomplished by having the CCU 28 monitor the number of transceivers 36 in use and sending out a status flag if the number of transceivers 36 in use is near the total number of transceivers 36. The CAUs 16 receive this status flag and open the switch 124 which supplies power to the telephone 40. Which prevents the system 10 from having to supply power to the telephones 40, when no channel is available to place a telephone call.

Figure 9:
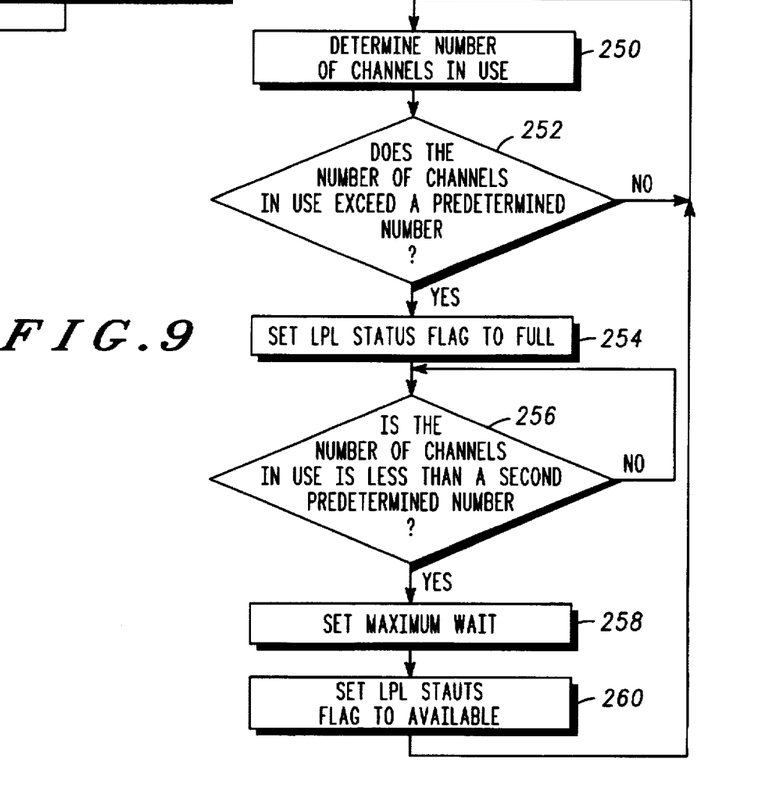
FIG. 9 is a flow diagram of a process used by a cable control unit to determine when a channel is available.

This process, as applied by the CCU 28, is described in more detail in FIG. 9. First the CCU 28 determines, in step 250, the number of channels in use. Next, the CCU 28 determines, in step 252, if the number of channels in use exceeds a first predetermined number. If the number of channels in use does exceed a first predetermined number, the LPL status flag 216 is set, in step 254, to full. If the number of channels in use does not exceed a first predetermined number, processing returns to step 250. After the status flag 216 is set to full, the CCU 28 determines, in step 256, if the number of channels in use is less than a second predetermined number. In the preferred embodiment, the second predetermined number is less than the first predetermined number. This adds a hysteresis to the system channel capacity. Until the number of channels in use is less than a second predetermined number, processing stays at step 256. When the number of channels in use is less than a second predetermined number, a maximum wait time is set at step 258. Then, the LPL status flag 216 is set, at step 260, to available. Processing then returns to step 250.

Figure 10:
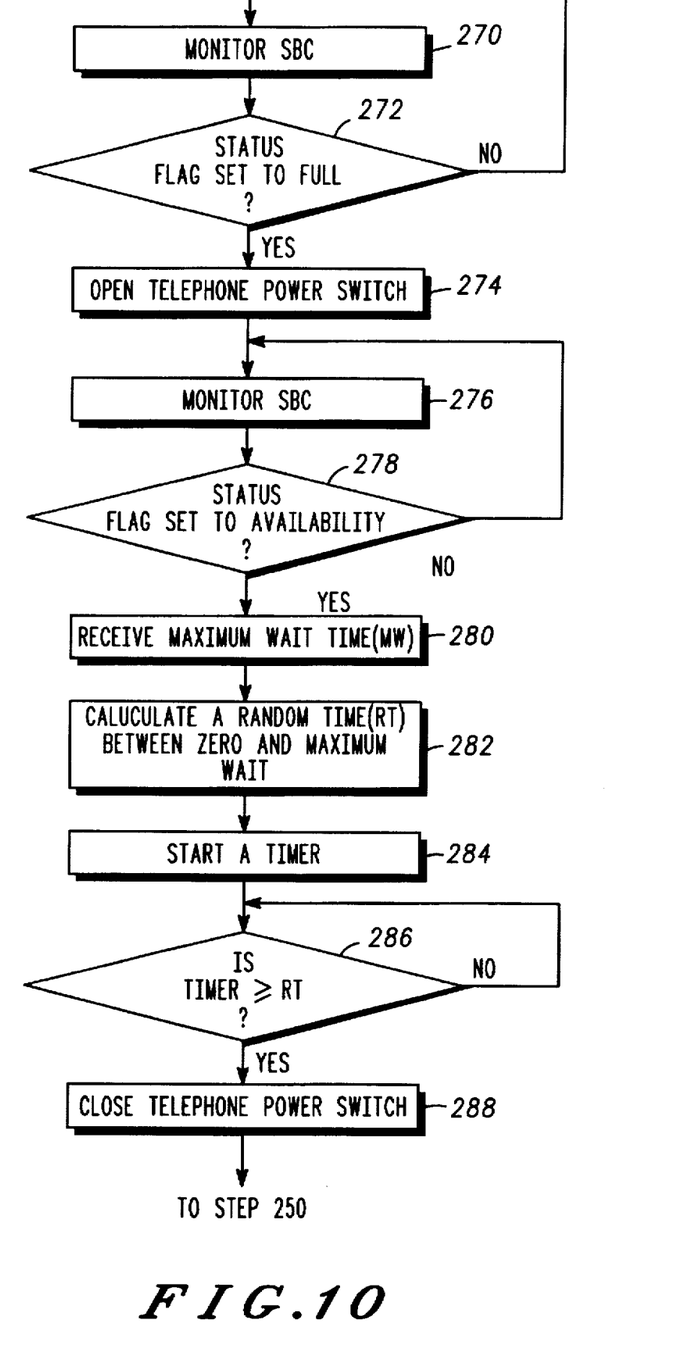
FIG. 10 is a flow diagram of a process used by a cable access unit to determine if a channel is available.

FIG. 10 describes this process as implemented by the CAU 16. The CAU 16 monitors, at step 270, the system broadcast channel. Next, the CAU 16 determines, at step 272, if the LPL status flag 216 is set to full. If the LPL status flag 216 is not set to full, then processing returns to step 270. If the LPL status flag is set to full, then the CAU 16 opens, at step 274, the telephone power switch 124. Next, the CAU 16 monitors, at step 276, the SBC. At step 278, the CAU 16 determines if the LPL status flag 216 has been set to available. If the LPL status flag 216 has not been set to available, then processing returns to step 276. If the LPL status flag 216 has been set to available, then the CAU 16 receives, at step 280, a maximum wait time. Next the CAU 16, calculates, at step 282, a random time between zero and the maximum wait time. A timer is started at step 284. Then the CAU 16 determines, at step 286, if the timer is greater than or equal to the random time. If the timer is not greater than or equal to the random time, then processing waits at step 286 until the timer is greater than or equal to the random time. Once the timer equals or exceeds the random time, the CAU 16 closes, at step 288, the telephone power switch 124. Processing then returns to step 250. This process describes the second subsystem that is designed to deal with the loop current power problem resulting from too many telephones 40 being in the off-hook mode.

An alternative embodiment of this process, uses a deterministic, queuing system that does not close the telephone power switch 124 until the CCU 28 has determined a telephone channel is available for the CAU 16 and associated telephone 40. As a result, the maximum number of telephones 40 drawing off-hook power, twenty four volts DC at twenty five milliamps, at any one time is equal to the total number of telephone channels.

Figure 11:
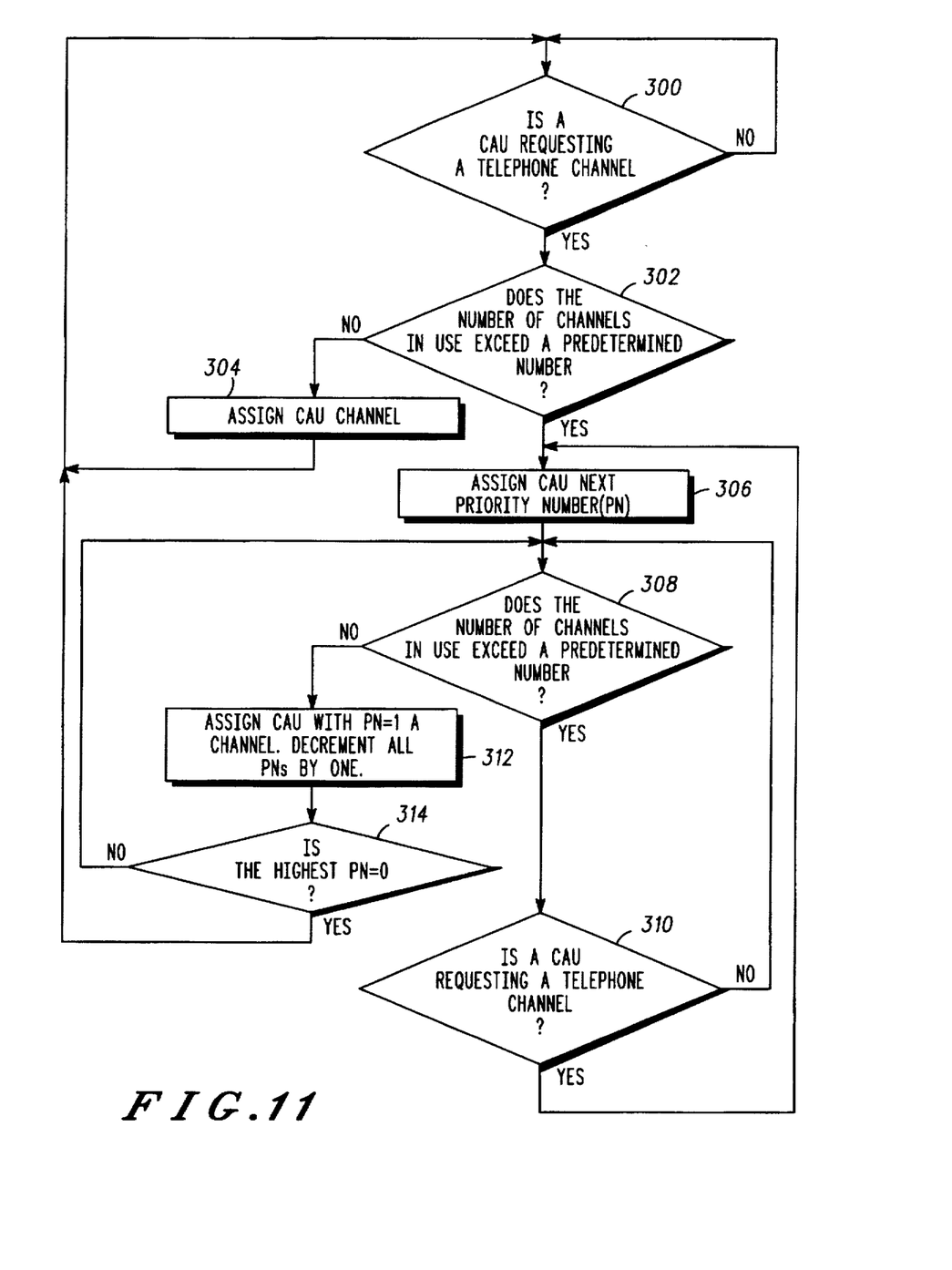
FIG. 11 is a flow chart of an alternative process used by a cable control unit to determine when a channel is available.

This process, as applied by the CCU 28, is described in more detail in FIG. 11. First, the CCU 28 determines, at step 300, if the CAU 16 is requesting a telephone channel. If no CAU 16 is requesting a telephone channel, then processing waits at step 300. Once the CAU 16 requests a channel, the CCU 28 determines, at step 302, if the number of channels in use exceeds a predetermined number. If the number of channels in use does not exceed a predetermined number, then the CCU 28 assigns, at step 304, a channel to the CAU 16 and processing returns to step 300. If the number of channels in use exceeds a predetermined number, then the CCU 28 assigns, at step 306, the CAU 16 the next priority number (PN). The priority number would be one if the CAU 16 were the first to request a channel after all the channels were full. Thus, priority numbers set up a queue for channels as they become available. Next, the CCU 28 determines, at step 308, if the number of channels in use exceeds a predetermined number. If the number of channels in use exceeds a predetermined number, the CCU 28 determines, at step 310, if the CAU 16 is requesting a channel. If a CAU 16 is requesting a channel, then processing returns to step 306, where a priority number is assigned. If a CAU 16 is not requesting a channel, then processing returns to step 308. If at step 308, the number of channels in use does not exceed a predetermined number, then the CCU 28 assigns, at step 312, the CAU 16 with the priority number of one a channel and the priority numbers are all decremented by one. Next, the CCU 28 determines, at step 314, if the highest priority number is equal to zero. If the highest priority number is not equal to zero, then processing returns to step 308. If the highest priority number is equal to zero, then processing returns to step 300.

Figure 12:
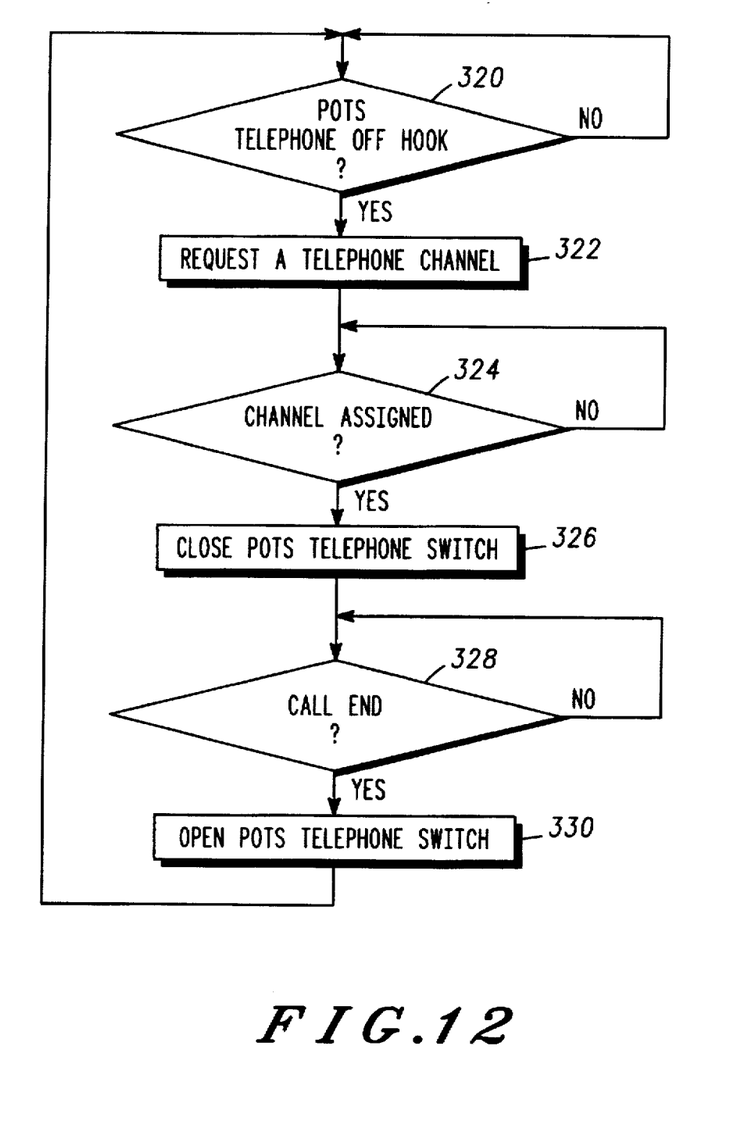
FIG. 12 is a flow diagram of an alternative process used by a cable access unit to determine if a channel is available.

This processes, as implement by the CAU 16, is described in more detail in FIG. 12. The process begins with the CAU 16 determining, at step 320, if the telephone 40 is off-hook. If the telephone 40 is not off-hook, the CAU 16 waits until the telephone 40 is off-hook. Next, the CAU 16 requests, at step 322, a telephone channel. Then the CAU 16 waits, at step 324, until a channel is assigned. Once a channel is assigned the CAU 16 closes, at step 326, the telephone power switch 124. Then the CAU 16 waits, at step 328, until the phone call has ended. Once the telephone call has ended, the CAU 16 opens, at step 330, the telephone power switch 124. Processing then returns to step 320.

In summary, the present invention provides a method and system for controlling power consumption and access to telephone channels in a cable telephony system. This accomplished with two subsystems, one for limiting power and access when the telephone is waiting to receive a telephone call and a second for limiting power and access when a subscriber wants to place a call. A telephone is usually in the first mode, waiting for a telephone call. The first subsystem reduces power consumption by having the RF TDMA transceiver for the POTS telephone only monitor for incoming calls periodically and turns off the transceiver when not monitoring for calls. The second subsystem, limits system power consumption and telephone channels by only allowing loop current and access to channels when a channel is available for use. These two subsystems significantly reduce the overall system power consumption and regulate access to the telephone channels. Using this system allows existing cable operators to provide POTS service without expensive changes to their existing power distribution network.

While the invention is described with respect to the power distribution problem associated with providing POTS in an existing cable system, the invention has applications beyond this problem. For instance, the invention can be used to regulate the access to a limited number of telephone channels or to a limited number of data channels. For those skilled in the art many other alternatives, modifications and variations will be obvious. For instances, the invention is described with respect to FTDMA telephony channels, however the telephony channels could be code division multiple access (CDMA). Accordingly, it is intended to embrace all such alternatives, modifications and variations as fall within the spirit and broad scope of the appended claims.

What is claimed is:

1. A method for saving power in a cable system carrying at least a plurality of telephone signals, wherein the plurality of telephone signals are provided to a plurality of subscribers through a plurality of cable access units and the telephone signals connect to a public switch telephone network through a cable control unit, a cable having a plurality of channels over which the plurality of telephone signals are carried, the method comprising the steps of:

receiving a system broadcast channel having control information, wherein the system broadcast channel is transmitted over one of the plurality of channels;

dividing the plurality of cable access units into alert phase groups corresponding to a number of alert phases transmitted over the system broadcast channel; and increasing power to the plurality of cable access units in one of the alert phase groups which corresponds to one of the alert phases presently being transmitted over the system broadcast channel.

2. The method according to claim 1, wherein the step of increasing power to the plurality of cable access units, further includes the step of monitoring, in each of the plurality of cable access units, the control information in the alert phase.

3. The method according to claim 2, wherein the step of monitoring, further includes the step of acquiring a frame interval and turning off the power at the end of the alert phase to the plurality of cable access units in the associated alert phase unless an associated telephone is engaged in a telephone call.

4. The method according to claim 2, wherein the step of monitoring, further includes the step of determining, in each of the plurality of cable access units in the alert phase, if an alert flag associated with the cable access unit has been transmitted.

5. The method according to claim 4, wherein the step of determining if the alert flag has been transmitted, further includes the step of receiving an incoming call, if the alert flag is transmitted.

6. The method of claim 1 wherein the step of increasing power to the plurality of cable access units comprises supplying power over the cable with the plurality of telephone signals.

7. A system for controlling access to a plurality of channels in a cable system, comprising:

a cable over which the plurality of channels are carried;

a plurality of cable access units connected to the cable;

a plurality of devices each connected to one of the plurality of cable access units;

a cable control unit connected to the cable, having a fixed number of channels, said cable control unit monitoring the number of channels presently in use, if the number of channels presently exceeds a predetermined number, setting a status flag, and transmitting the status flag over a system broadcast channel being simultaneously received by a selected number of the plurality of cable access units; and said selected number of the plurality of cable access units simultaneously monitoring said system broadcast channel and if said status flag is set, denying access to the plurality of channels for any of the plurality of devices requesting access after the status flag is set.

8. The system of claim 7, wherein each of the plurality of cable access unit provides power to the plurality of standard telephones to which they are connected.

9. The system of claim 8, wherein the plurality of cable access units deny power to the plurality of standard telephones when the status flag is set and the plurality of standard telephones changes to the off-hook state after the status flag is set.

10. The system of claim 8, wherein the plurality of cable access units receive power from the cable.

11. The system of claim 8, wherein the plurality of cable access units have a standard RJ11 plug for connecting to the plurality of standard telephones.

12. A method for determining if one of a plurality of channels is available in a cable system, wherein a plurality of cable access units are connected to a cable control unit by a cable carrying the plurality of channels, the method comprising the steps of:

(a) a plurality of cable access units within an alert phase group simultaneously monitoring a system broadcast channel transmitted over the cable;

(b) determining if a system status flag is set to occupied;

(c) if the system status flag is set to occupied, denying access to a user which requests access to one of the plurality of channels; and (d) repeating step (a);

(e) if the system status flag is set to available, allowing access to a user requesting access to one of the plurality of channels and repeating step (a).

(f) determining if the system status flag has changed from occupied to available (g) if the system status flag has changed from occupied to available, determining a maximum wait time, calculating a random time between zero and the maximum wait time for each of the plurality of cable access units; and h) denying access to a user associated with one of the plurality of cable access units that requests access to one of the plurality of channels, until the random time has passed.

13. The method of claim 12, wherein step (c) further includes the steps of, if the system status flag is set to available, allowing access to a user which request access to one of the plurality of channels, and repeating step (a).

14. A method of reducing power consumption in a cable telephone system, the cable telephone system comprising a plurality of cable access units connected to a plurality of telephones, the plurality of cable access units providing power to the plurality of telephones, the method comprising:

(a) monitoring a system broadcast channel;

(b) determining if a status flag is set to full; and (c) if the status flag is set to full, denying power to any of the plurality of telephones which changes to an off-hook state;

(d) monitoring the system broadcast channel (e) if the status flag changes to available, receiving a maximum wait period over the system broadcast channel;

(f) determining a random time for each of the plurality of cable access units between zero and the maximum wait period; and (g) waiting the random time until allowing power to a telephone associated with each of the plurality of cable access units.

15. A power conserving cable access unit comprising:

an assigned periodic alert phase which is common with a predetermined number of other cable access units coupled to a common cable communication telephony network;

an interval timer counting through an interval and generating a timer output signal upon expiration of the interval, when the expiration of the interval corresponds to an occurrence of the periodic alert phase;

a transceiver having a low power mode and a high power mode; and the transceiver responding to the timer output signal by entering the high power mode from the low power mode.

\* \* \* \* \*